Sept. 23, 1969  MICHIAKI ITO  3,468,598

LIGHT BEAM TRANSMISSION SYSTEM

Filed Aug. 22, 1967

INVENTOR.
MICHIAKI ITO
BY
Hopgood & Calimafde
ATTORNEYS

3,468,598
LIGHT BEAM TRANSMISSION SYSTEM
Michiaki Ito, Tokyo, Japan, assignor to Nippon Electric Company, Limited, Tokyo-to, Japan
Filed Aug. 22, 1967, Ser. No. 662,442
Claims priority, application Japan, Aug. 31, 1966, 41/57,408
Int. Cl. G02b 23/02
U.S. Cl. 350—45                                    4 Claims

ABSTRACT OF THE DISCLOSURE

An optical system is provided for transmitting coherent light beams comprising an elongated optical pathway having spaced transversely along the pathway thereof, a plurality of matrices, each of said matrices having a plurality of optical lenses disposed essentially along a transverse plane, whereby a plurality of beams can be transmitted along the pathway. In a preferred embodiment, each of the matrices has the same number of lenses, such that the number of beams that can be transmitted along the pathway is equal to the square of the number of lenses in a matrix.

---

This invention relates to a light beam transmission system and, more particularly, to a light beam transmission system in which an extremely elongated enclosed light path is used in common for transmission of a plurality of coherent light beams.

The hitherto-proposed light beam transmission system using an enclosed light path comprises, a confocal lens arrangement composed of a series of lenses, disposed at an interval of several hundred meters to several kilometers along the transmission path of the light beam with their optical axes being coincident with each other, and an extremely elongated tube made of synthetic resin for covering said lens arrangement. The arrangement is adopted so so that the effect of the atmospheric disturbance between lenses may be avoided and that the light beam may be transmitted along the optical axis of the lens, without deviating therefrom. However, since the hitherto-proposed system cannot transmit more than one light beam, it is not practical from the economical point of view.

The advent of coherent light beams, such as the laser beam, has opened up vast potential uses in science and technology, among which are: the projection of intense energy into a small area, the determination of the spectra of materials, the determination of the distance, velocity and direction of distant objects by means of reflected signals and the transmission of meaningful signals, such as sound, pictures or data, from one point to another. With regard to the latter as applied to the field of communication, laser beams are known to have the theoretical ability of carrying enormous amounts of information. For example, where it is desirable to employ a plurality of laser beams to carry information signals, each of the beams would be intensity-modulated at the transmitter station by multiplexed information signals. That is to say, each of the beams would correspond to microwave beam employed in the conventional microwave communication systems. Since a laser beam is substantially a single wavelength, it can be easily and accurately focused by means of an optical lens system without spreading the beam as commonly occurs with ordinary light.

It would be desirable to provide a single optical pathway, whereby a plurality of coherent light beams can be transmitted.

It is thus an object of the present invention to provide a light beam transmission system in which an extremely elongated enclosed light path or optical pathway is used in common for transmission of a plurality of light beams without causing substantial interference between the beams.

The light beam transmission system of the present invention can separately transmit $N^2$ light beams, by installing transversely along the transmission direction of the light beams, a plurality of the matrices respectively having a plurality of optical lenses or systems capable of forming erect real images of the input light sources, and by disposing the matrices in such a manner that each of the optical lenses or systems in the matrices forms the image of the neighboring matrix upon the optical system of neighboring matrix at the opposite side. Putting it another way, the number of light beams capable of being transmitted is equal to the square of the number of lenses N in a matrix.

According to the present invention, since a single optical system is used in common for N light beams, the cost of constructing the transmission path or optical pathway per light beam decreases according to the number N of the light beams transmitted. Hence, the economical advantages of the present invention are appreciable.

The advantages of the invention will more clearly appear from the following disclosure and the accompanying drawings, wherein.

Figure 1:
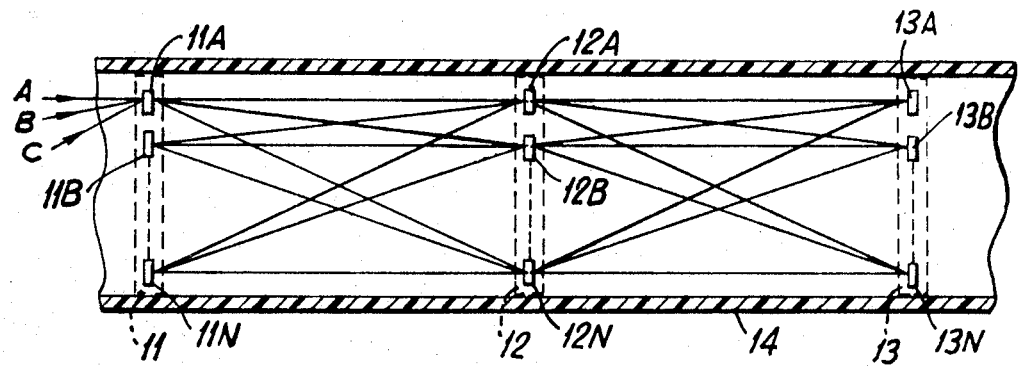
FIG. 1 is a schematic diagram of one embodiment of the present invention.

Referring now to FIG. 1, N optical systems 11A, 11B . . . and 11N are shown disposed transversely in a plane substantially perpendicular to the principal axis to provide a matrix 11. Matrices 12 and 13 similarly comprise a set of optical systems 12A, 12B . . . and 12N, and a set of optical systems 13A, 13B . . . and 13N, the matrices shown being installed in an enclosed light path, such as a tube of aluminum, glass, or preferably a synthetic resin, each of the matrices being spaced a certain distance from each other along the transmission direction of the optical pathway. Although only the matrices 11, 12 and 13 are shown for the convenience of illustration, it will be obvious to those skilled in the art that additional matrices may be added along the light path. These matrices 11, 12 and 13 are arranged in such a manner that the images of N optical systems 11A, 11B . . . and 11N are respectively formed on the optical systems 13A, 13B . . . and 13N by transmission through optical systems 12A, 12B . . . and 12N. The adjacent matrix (not shown) installed on the right-hand side of the matrix 13 corresponds to the matrix 12, while the next-to-adjacent one (not shown) corresponds to the matrix 13. In other words, the process performed by three matrices 11, 12 and 13 shown in the drawing is repeated along the transmission path.

Figure 2:
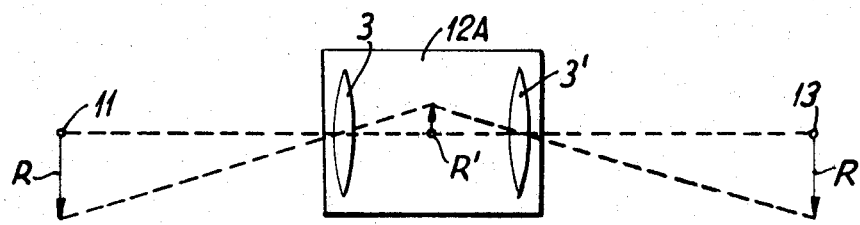
FIGS. 2 and 3 show schematically the optical systems which may be used in the embodiment of FIG. 1.
Figure 3:
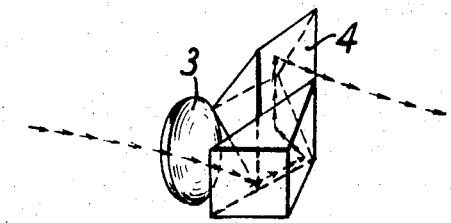

As illustrative of the optical system having the desired characteristics, the combination of lenses shown in FIG. 2, or the combination of a lens and the two prisms shown in FIG. 3, or the like, may be used.

In the optical system shown in FIG. 2, an optical image R on the matrix 11 is converted by a lens 3 of the optical system 12A into an inverted real image R', which is in turn projected by means of a lens 3′ on the matrix 13. As easily derived from the theory of the geometrical optics, the relation between the focal length $f$ of the lens 3, the focal length $f'$ of the lens 3′, the distance $d$ between the lenses 3 and 3′, the distance $D_{12}$ between the matrices 11 and 12, and the distance $D_{23}$ between the matrices 12 and 13, fulfills the necessary and sufficient condition expressed by the following equation:

$$d = \frac{1}{\frac{1}{f} - \frac{1}{D_{12}}} + \frac{1}{\frac{1}{f'} - \frac{1}{D_{23}}}$$

In the example shown in FIG. 3, an erect real image is formed on the plane of the matrix 13 by reversing, by means of two rectangular prisms coupled with their edges perpendicular to each other, top and bottom, and right-hand and left-hand side of the inverted real image formed by the lens 3. Since this combination is ordinarily used in the conventional binoculars, the detailed illustration will be omitted.

In the embodiment shown in FIG. 1, beams A, B and C are shown incident to lens 11A, similar beams being directed to each of lenses 11B . . . and 11N. When a laser beam characterized by sharp directivity or excellent convergence is used as the light beam directed from matrix 11 to matrix 12, one of the light beams directed from the optical system 11A of the matrix 11 to the optical system 12A of the matrix 12 is caused to be incident upon the optical system 12A without extending to other elements 12B–12N. This condition is fulfilled by choosing the apertures of the optical systems 11A, 12A and so forth, to be sufficiently large as compared with the geometric means value $\sqrt{\lambda D_{12}}$, where $\lambda$ is the wavelength of the laser light, $D_{12}$ is the distance between the two matrices 11 and 12. Therefore, the interference due to the diffraction of the laser beam may considerably be reduced by suitably choosing the aperture and the spatial interval between the optical systems in each matrix.

Also, inasmuch as the ordinary glass and air do not cause any nonlinear phenomenon, as regards the laser light region, two light beams passing through the same optical system 12A will not interact with each other, one of which takes a path from the system 11A to the system 13A through the system 12A, the other of which takes another path from the system 11B to the system 13B through the system 12A. Since N light beams can be transmitted in this way to the systems 12A, 12B . . . and 12N through each of the optical systems 11A, 11B . . . and 11N, $N^2$ light beams can be separately transmitted as a whole.

With regard to the above-mentioned embodiment, a numerical example is given as follows:

(1) The number of the optical systems in each matrix: ten to one hundred.
(2) The spatial interval between the matrices: several hundred meters to two thousand meters.
(3) The aperture of the lenses of each optical system: several centimeters to around ten centimeters.
(4) The diameter of the enclosed light path: one meter to two meters.
(5) The spatial interval between the repeaters (assuming that the attenuation of the light beam caused by each matrix is approximately one decibel): approximately fifty kilometers.

What is claimed is:

1. An optical system for transmitting a plurality of beams of coherent light which comprises, an optical pathway for transmitting a plurality of coherent light beams, and a plurality of optical matrices disposed transversely of and in spaced relationship along said pathway, each of said matrices having a plurality of optical lenses disposed essentially along a transverse plane and being capable of forming a real image of an input optical image, the position between matrices being such that the erect real images of a matrix adjacent a neighboring matrix may be formed by each of said optical lenses on said neighboring matrix and upon each of said optical systems on another matrix disposed on the other side of said neighboring matrix.

2. The optical system of claim 1, wherein each of the matrices have the same number of optical lenses and wherein the number of light beams that can be accommodated by said optical pathway is equal to the square of the number of optical lenses in a matrix.

3. The optical system of claim 1, wherein the optical pathway is enclosed within a hollow elongated member.

4. The optical system of claim 3, wherein the hollow elongated member is a tube of synthetic resin.

References Cited
UNITED STATES PATENTS 3,296,923    1/1967    Miles.

DAVID SCHONBERG, Primary Examiner

P. A. SACHER, Assistant Examiner

U.S. Cl. X.R.

350—54, 167